US010731343B2

(12) United States Patent
Brooks et al.

(10) Patent No.: US 10,731,343 B2
(45) Date of Patent: Aug. 4, 2020

(54) CONSTRUCTION PANEL HAVING IMPROVED FIXING STRENGTH

(71) Applicant: Saint-Gobain Placo SAS, Suresnes (FR)

(72) Inventors: Laura Brooks, Loughborough (GB); Nicola Jupp, Coventry (GB); Joanna Sparkes, Coventry (GB); Elodie Taboulot, Aubervilliers (FR); Adam Richardson, Coventry (GB); Nicholas Jones, Coventry (GB); Jan Rideout, Rothley (GB)

(73) Assignee: Saint-Gobain Placo SAS (FR)

( * ) Notice: Subject to any disclaimer, the term of this patent is extended or adjusted under 35 U.S.C. 154(b) by 0 days.

(21) Appl. No.: 15/521,335

(22) PCT Filed: Nov. 19, 2015

(86) PCT No.: PCT/GB2015/053536
§ 371 (c)(1),
(2) Date: Apr. 24, 2017

(87) PCT Pub. No.: WO2016/079529
PCT Pub. Date: May 26, 2016

(65) Prior Publication Data
US 2017/0306623 A1 Oct. 26, 2017

(30) Foreign Application Priority Data

Nov. 20, 2014 (GB) .................................. 1420676.7

(51) Int. Cl.
| *E04C 2/04* | (2006.01) |
| *C04B 28/14* | (2006.01) |
| *C04B 14/42* | (2006.01) |
| *C04B 16/02* | (2006.01) |
| *C04B 24/38* | (2006.01) |
| *C04B 111/00* | (2006.01) |

(52) U.S. Cl.
CPC .............. *E04C 2/043* (2013.01); *C04B 14/42* (2013.01); *C04B 16/02* (2013.01); *C04B 24/383* (2013.01); *C04B 28/14* (2013.01); *C04B 2111/0062* (2013.01); *Y02W 30/97* (2015.05)

(58) Field of Classification Search
CPC .... Y02W 30/97; E04C 2/043; C04B 20/0052; C04B 16/06; C04B 16/02; C04B 32/02; C04B 28/14; C04B 24/14; C04B 14/42; C04B 24/383; C04B 2111/0062; C04B 14/38; C04B 18/241; C04B 24/282; C04B 18/24
USPC ....... 428/297.4, 300.4, 299.4, 299.7, 311.17, 428/312.4, 294.7, 311.71, 703; 106/713, 106/772, 780, 819, 400, 782, 73
See application file for complete search history.

(56) References Cited

U.S. PATENT DOCUMENTS

| 5,171,366 A * | 12/1992 | Richards ................. B28B 1/525 |
| | | 106/772 |
| 8,187,423 B1 | 5/2012 | Glenn et al. |
| 2005/0284339 A1* | 12/2005 | Brunton .................. C04B 28/02 |
| | | 106/713 |
| 2007/0048490 A1 | 3/2007 | Yu et al. |
| 2007/0048549 A1 | 3/2007 | Song et al. |
| 2007/0059513 A1 | 3/2007 | Yu et al. |
| 2008/0070026 A1 | 3/2008 | Yu et al. |
| 2009/0208704 A1* | 8/2009 | Diwanji .................. B32B 13/02 |
| | | 428/141 |
| 2014/0000195 A1 | 1/2014 | Daniels et al. |
| 2016/0347662 A1* | 12/2016 | Andersen ................ C04B 28/04 |
| 2017/0113971 A1* | 4/2017 | Andersen ................ C04B 28/04 |

FOREIGN PATENT DOCUMENTS

| EP | 1158109 A2 | 11/2001 |
| JP | 2005205879 A | 8/2005 |
| JP | 2009299460 A | 12/2009 |
| MX | 2009004680 A | 11/2009 |
| WO | 2005060628 A2 | 7/2005 |
| WO | 2013087705 A2 | 6/2013 |
| WO | 2014005091 A1 | 1/2014 |

OTHER PUBLICATIONS

The Second Office Action for Chinese counterpart Application 201580061871.7 for Saint-Gobain Placo SAS, dated Aug. 21, 2019, and English translation thereof.

* cited by examiner

*Primary Examiner* — Camie S Thompson
(74) *Attorney, Agent, or Firm* — GrayRobinson, P.A.; Michael J. Colitz, III

(57) ABSTRACT

A plasterboard comprises a gypsum matrix having a polymeric additive distributed therein in an amount of at least 1 wt % relative to the gypsum, the gypsum matrix further having a first group of fibres and a second group of fibres embedded therein, wherein the fibres of the first group of fibres have an average length that is at least three times the average length of the fibres of the second group of fibres.

18 Claims, No Drawings

CONSTRUCTION PANEL HAVING IMPROVED FIXING STRENGTH

CROSS-REFERENCE TO RELATED APPLICATIONS

This is the U.S. National Stage entry of International Application No. PCT/GB2015/053536, filed Nov. 19, 2015, which claims priority to GB Application No. 1420676.7, filed Nov. 20, 2014. These prior applications are incorporated herein by reference in their entirety.

FIELD OF THE INVENTION

The present invention relates to panels for use in building construction. In particular, the present invention relates to panels for providing partitions to which items such as sinks, televisions, or radiators may be affixed.

BACKGROUND TO THE INVENTION

Light-weight panels such as plasterboard (e.g. gypsum plasterboard), polystyrene board and fibreboard are commonly used to provide partitions within buildings. Their advantages for this application include the fact that they are light and quick to install.

However, in certain cases, such light-weight panels may have the drawback that they are not strong enough to support fixtures (e.g. sinks, televisions, radiators, fire extinguishers, shelves and any other item that requires attachment to the panel). In such cases, the weight of the fixture may cause the fixing means (e.g. screws) to be pulled out of the panel, such that the fixture falls away from the partition.

Typically, this problem has been addressed by providing plywood sheets to increase the fixing strength of the panel. In this case, the plywood sheet is provided on the side of the panel opposite to that on which the fixture is to be located. The plywood sheet may provide increased strength for retaining one or more fixing means (e.g. screws) employed to secure the fixture to the panel. Typically, the plywood sheet is positioned within the partition framework, and the plasterboard then fixed to the plywood, so that it lies outside the partition framework.

As an alternative, metal support means may be provided. These may comprise fixing plates, channels, straps, or metal fasteners. As is the case for plywood sheets, the metal support means are generally positioned on the side of the panel opposite that to which the fixture is to be secured, and act to receive and secure fixing means, e.g. fixing screws, that are used to attach the fixture to the panel.

Both these arrangements have the disadvantage that they require the panels and the additional supporting components to be affixed to each other on-site. Moreover, when metal support means are used, a plurality of such support means may be needed to support the full set of fixing means required to secure the fixture to the panel. Thus, the installation process may be time-consuming and expensive.

Furthermore, the addition of metal support means or plywood sheets increases the weight and thickness of the partition, and/or results in a reduction in cavity wall space. In general, the plywood itself must be cut to size on site, thus increasing the time required for installation and possibly leading to the release of dust and potentially harmful components.

Therefore, there is a need to provide improved panels that are able to retain fixing means and support fixtures, and that do not require time-consuming installation processes.

SUMMARY OF THE INVENTION

It has been found that by including a mixture of fibres in the plasterboard, an improvement in the ability of the panel to retain fixing means may be achieved. This may allow stronger plasterboards to be produced, or lighter plasterboards having acceptable strength.

It has also been observed that by using a mixture of fibres, the viscosity of stucco slurry may be decreased, thereby allowing for easier manufacture of the plasterboard.

Therefore in a first aspect, the present invention may provide a plasterboard comprising a gypsum matrix having a polymeric additive distributed therein in an amount of at least 1 wt % relative to the gypsum, the gypsum matrix further having a first group of fibres and a second group of fibres embedded therein, wherein the fibres of the first group of fibres have an average length that is at least three times the average length of the fibres of the second group of fibres.

Preferably, the fibres of the first group of fibres have an average length that is at least four times the average length of the fibres of the second group of fibres.

By including shorter fibres in addition to longer fibres, it may be possible to increase the strength of the plasterboard, while avoiding increases in the viscosity of the stucco slurry used to produce the board. Excessive viscosity of the slurry tends to be linked to the formation of voids and/or the need to reduce line speeds during production in order to avoid this.

The first group of fibres may comprise inorganic fibres, such as glass fibres. The glass fibres typically have an average length greater than 1 mm, preferably greater than 2 mm, most preferably greater than 3 mm. In general, the glass fibres have an average length less than 10 mm, preferably less than 8 mm.

Preferably, the glass fibres are coated with a sizing agent to increase their affinity to gypsum, as is known in the art.

The second group of fibres may comprise organic fibres, such as cellulose-based fibres (for example, cellulose fibres or wood fibres). The cellulose-based fibres typically have an average length greater than 100 µm, preferably greater than 200 µm. In general, the cellulose-based fibres have an average length less than 1.8 mm, preferably less than 1 mm, most preferably less than 800 µm. In general, the thickness of the cellulose-based fibres is greater than 10 µm, preferably greater than 20 µm. Typically, the thickness of the cellulose-based fibres is less than 60 µm, preferably less than 40 µm.

The apparent density of the cellulose-based fibres before incorporation into the gypsum product is typically less than 250 g/L.

In other embodiments, the organic fibres may be e.g. polyethylene, polypropylene, or polyester fibres.

Typically, the fibres of the first group of fibres have an average length that is greater than 1 mm, preferably greater than 2 mm, most preferably greater than 3 mm. In general, the fibres of the first group of fibres have an average length that is less than 10 mm, preferably less than 8 mm.

The fibres of the second group of fibres typically have an average length greater than 100 µm, preferably greater than 200 µm. In general, the fibres of the second group of fibres have an average length less than 1.8 mm, preferably less than 1 mm, more preferably less than 800 µm.

In general, the thickness of the fibres of the second group of fibres is greater than 10 µm, preferably greater than 20 µm. Typically, the thickness of the fibres of the second group of fibres is less than 60 µm, preferably less than 40 µm.

In general, the first and second groups of fibres are present in a total amount that is less than 20 wt % relative to the gypsum matrix, preferably less than 15 wt %, more preferably less than 10 wt %.

Preferably, the polymeric additive is distributed in the gypsum matrix in an amount of at least 2 wt %, most preferably at least 3 wt %.

Typically, the polymeric additive is a starch. Preferably, the polymeric additive is present in an amount of less than 20 wt % relative to the gypsum matrix, preferably less than 15 wt %.

In certain embodiments of the first aspect of the invention, the plasterboard has paper facings. These paper facings may comprise both cellulose fibres and glass fibres, as this is thought to improve the fire resistance of the plasterboard. In other cases, the plasterboard may have a mat partially or fully embedded at its surface, for example, a glass mat.

In certain embodiments of the first aspect of the invention, the gypsum matrix comprises a hydrophobic additive, such as silicone oil or wax.

In certain embodiments of the first aspect of the invention, the gypsum matrix may contain a biocide.

In certain embodiments of the first aspect of the invention, the gypsum matrix may contain an anti-shrinkage agent such as unexpanded vermiculite, microsilica, and/or clay, in order to improve the fire-resistance of the product.

Certain embodiments of the first aspect of the invention may include foam or lightweight aggregate such as perlite. Such additives are known in the art to produce lower-density boards having acceptable thickness.

DETAILED DESCRIPTION

The invention will now be described by way of example only.

Gypsum plasterboards were prepared using the following general methodology:

Stucco and other dry additives were weighed into a bag and shaken to mix them. Water and wet additives were weighed into a bowl. The fibres were weighed, added to the wet additives in the bowl, and mixed together using an electric mixer for 30 s.

The dry powdered additives were added to the wet additives in the bowl and mixed in with the electric mixer for 30 s.

The resultant slurry was sandwiched between two sheets of boardline paper and allowed to hydrate for 25 minutes measured from the time of mixing. The board was then dried in an oven for 50 minutes at 180° C. with a relative humidity greater than 80%.

Example 1

A gypsum plasterboard was prepared from the following ingredients:
stucco;
ethylated starch in an amount of 5 wt % relative to the amount of stucco (the starch is available from Grain Processing Corporation under the trade name Coatmaster K57F);
glass fibre in an amount of 5 wt % relative to the amount of stucco. The glass fibres had an average length of 6 mm;
cellulose fibre in an amount of 2 wt % relative to the amount of stucco. The cellulose fibres had an average length of 500 micron and an average diameter of 35 micron.

Example 2

A gypsum plasterboard was prepared from the following ingredients:
stucco;
ethylated starch in an amount of 10 wt % relative to the amount of stucco (the starch is available from Grain Processing Corporation under the trade name Coatmaster K57F);
glass fibre in an amount of 5 wt % relative to the amount of stucco. The glass fibres had an average length of 6 mm;
cellulose fibre in an amount of 5 wt % relative to the amount of stucco. The cellulose fibres had an average length of 500 micron and an average diameter of 35 micron.

Comparative Example 1

A gypsum plasterboard was prepared from the following ingredients:
stucco;
ethylated starch in an amount of 5 wt % relative to the amount of stucco (the starch is available from Grain Processing Corporation under the trade name Coatmaster K57F);
glass fibre in an amount of 5 wt % relative to the amount of stucco. The glass fibres had an average length of 6 mm.

Comparative Example 2

A gypsum plasterboard was prepared from the following ingredients:
stucco;
ethylated starch in an amount of 10 wt % relative to the amount of stucco (the starch is available from Grain Processing Corporation under the trade name Coatmaster K57F);
glass fibre in an amount of 5 wt % relative to the amount of stucco. The glass fibres had an average length of 6 mm.

Comparative Example 3

A gypsum plasterboard was prepared from the following ingredients:
stucco;
starch in an amount of 6 wt % relative to the amount of stucco (the starch is available from Tate & Lyle under the trade name Merifilm);
glass fibre in an amount of 2 wt % relative to the amount of stucco. The glass fibres had an average length of 6 mm.

Comparative Example 4

A gypsum plasterboard was prepared from the following ingredients:
stucco;
starch in an amount of 6 wt % relative to the amount of stucco (the starch is available from Tate & Lyle under the trade name Merifilm);
glass fibre in an amount of 1 wt % relative to the amount of stucco. The glass fibres had an average length of 6 mm;

polypropylene fibre in an amount of 1 wt % relative to the amount of stucco. The polypropylene fibres had an average length of 6 mm.

Screw Pull-Out Strength

Screw pull-out tests were carried out on samples measuring 100 mm by 100 mm that had been conditioned at a temperature of 23° C. and a relative humidity of 50%. A 50 mm single thread wood screw was inserted into the sample, passing through a metal load transfer element positioned on the surface of the sample. The load transfer element has a first portion that is configured to lie between the screw head and the surface of the sample, and a second portion that is configured to engage with a testing machine so as to allow a load to be applied to the screw along the axis of the screw. The screw was tightened to a torque of 1 Nm.

The specimen was then mounted in a Zwick Universal Testing Machine and a 10N pre-load applied to the screw along the axis of the screw. Subsequently, the load was increased by setting a constant cross-head speed of 10 mm/minute until pull out was achieved.

The results are set out in Table 1. These are averages, each taken from 8 samples.

TABLE 1

| Example | Average screw pull-out strength |
| --- | --- |
| Example 1 | 494.9 |
| Comparative example 1 | 305.1 |
| Example 2 | 671.0 |
| Comparative example 2 | 535.5 |
| Comparative example 3 | 574 |
| Comparative example 4 | 558 |

The invention claimed is:

1. A plasterboard panel comprising a gypsum matrix positioned between opposing paper facings, the gypsum matrix having a polymeric additive distributed therein in an amount of at least 1 wt % relative to the gypsum of the gypsum matrix, the gypsum matrix further having a first group of fibres and a second group of fibres embedded therein, wherein the fibres of the first group of fibres have an average length that is at least three times the average length of the fibres of the second group of fibres.

2. A plasterboard according to claim 1, wherein the fibres of the first group of fibres have an average length of 2-10 mm.

3. A plasterboard according to claim 1 wherein the first and second groups of fibres are present in a total amount that is less than 20 wt % relative to the gypsum matrix.

4. A plasterboard according to claim 1, wherein the first group of fibres comprises glass fibres.

5. A plasterboard according to claim 1, wherein the second group of fibres comprises cellulose-based fibres.

6. A plasterboard according to claim 5, wherein the cellulose-based fibres have a length of 200 micron to 1.8 mm.

7. A plasterboard according to claim 5, wherein the cellulose-based fibres have a thickness of 20-60 micron.

8. A plasterboard according to claim 1, wherein the polymeric additive is starch.

9. A plasterboard according to claim 1, wherein the polymeric additive is present in an amount of less than 20 wt % relative the gypsum matrix.

10. A plasterboard panel comprising:
opposing paper facings;
a gypsum matrix extending between the paper facings;
a polymeric additive within the gypsum matrix in an amount of at least 1 wt % relative to the gypsum of the gypsum matrix;
cellulose-based fibres within the gypsum matrix; and
glass fibres within the gypsum matrix, the glass fibres having an average length that is at least three times the average length of the cellulose-based fibres.

11. The plasterboard of claim 10, wherein the glass fibres have an average length of 2-10 mm.

12. The plasterboard of claim 10, wherein the cellulose-based fibres and glass fibres are present in a total amount that is less than 20 wt % relative to the gypsum matrix.

13. The plasterboard of claim 10, wherein the cellulose-based fibres have a length of 200 micron to 1.8 mm.

14. The plasterboard of claim 10, wherein the polymeric additive is present in an amount of less than 20 wt % relative the gypsum matrix.

15. The plasterboard of claim 10, wherein the polymeric additive is starch.

16. The plasterboard of claim 10, wherein the cellulose-based fibres have a thickness of 20-60 micron.

17. The plasterboard of claim 10, wherein:
the polymeric additive is starch; and
the cellulose-based fibres and glass fibres are present in a total amount that is less than 20 wt % relative to the gypsum matrix.

18. The plasterboard of claim 10, wherein:
the polymeric additive is present in an amount of less than 20 wt % relative the gypsum matrix;
the glass fibres have an average length of 2-10 mm; and
the cellulose-based fibres have an average length of 200 micron to 1.8 mm.

* * * * *